United States Patent
Kang et al.

(10) Patent No.: US 12,120,331 B2
(45) Date of Patent: Oct. 15, 2024

(54) SYSTEM AND METHOD FOR COMPRESSING IMAGE BASED ON FLASH IN-MEMORY COMPUTING ARRAY

(71) Applicant: Peking University, Beijing (CN)

(72) Inventors: Jinfeng Kang, Beijing (CN); Yachen Xiang, Beijing (CN); Peng Huang, Beijing (CN); Xiaoyan Liu, Beijing (CN); Runze Han, Beijing (CN)

(73) Assignee: Peking University, Beijing (CN)

( * ) Notice: Subject to any disclaimer, the term of this patent is extended or adjusted under 35 U.S.C. 154(b) by 346 days.

(21) Appl. No.: 17/634,442

(22) PCT Filed: Dec. 31, 2019

(86) PCT No.: PCT/CN2019/130472
§ 371 (c)(1),
(2) Date: Feb. 10, 2022

(87) PCT Pub. No.: WO2021/027238
PCT Pub. Date: Feb. 18, 2021

(65) Prior Publication Data
US 2022/0321900 A1    Oct. 6, 2022

(30) Foreign Application Priority Data
Aug. 12, 2019   (CN) .......................... 201910738965.3

(51) Int. Cl.
*H04N 19/423*   (2014.01)
*H04N 19/124*   (2014.01)
*H04N 19/127*   (2014.01)

(52) U.S. Cl.
CPC ......... *H04N 19/423* (2014.11); *H04N 19/124* (2014.11); *H04N 19/127* (2014.11)

(58) Field of Classification Search
CPC .. H04N 19/423; H04N 19/124; H04N 19/127; H04N 19/182; H04N 19/42; G06N 3/044; G06N 3/045; G06N 3/084
See application file for complete search history.

(56) References Cited

U.S. PATENT DOCUMENTS

| | | | | |
|---|---|---|---|---|
| 9,916,531 | B1 * | 3/2018 | Zivkovic | G06N 3/063 |
| 10,559,093 | B2 * | 2/2020 | Pratapa | G06N 3/045 |

(Continued)

FOREIGN PATENT DOCUMENTS

| | | |
|---|---|---|
| CN | 106843809 A | 6/2017 |
| CN | 106971372 A | 7/2017 |

(Continued)

OTHER PUBLICATIONS

"Chinese Application Serial No. 201910738965.3, Office Action dated Apr. 29, 2020", w/ English Translation, (Apr. 29, 2020), 30 pgs.

(Continued)

*Primary Examiner* — Edward F Urban
*Assistant Examiner* — Jongbong Nah
(74) *Attorney, Agent, or Firm* — Schwegman Lundberg & Woessner, P.A.

(57) ABSTRACT

A system and a method for compressing an image based on a FLASH in-memory computing array are provided. The system includes: a convolutional neural network for encoding of the FLASH in-memory computing array, a convolutional neural network for decoding based on the FLASH in-memory computing array, and a quantization module; the convolutional neural network for encoding based on the FLASH in-memory computing array is configured to encode an original image to obtain a feature image; the quantization module is configured to quantize the feature image to obtain a quantized image; the convolutional neural network for (Continued)

decoding based on the FLASH in-memory computing array is configured to decode the quantized image to obtain a compressed image.

8 Claims, 1 Drawing Sheet

(56) References Cited

U.S. PATENT DOCUMENTS

| | | | |
|---|---|---|---|
| 2020/0020393 A1* | 1/2020 | Al-Shamma | G11C 16/26 |
| 2020/0192970 A1* | 6/2020 | Ma | G06N 3/044 |
| 2020/0285954 A1* | 9/2020 | Li | G06N 3/063 |

FOREIGN PATENT DOCUMENTS

| | | | | |
|---|---|---|---|---|
| CN | 108701236 A | | 10/2018 | |
| CN | 108805270 A | | 11/2018 | |
| CN | 110062231 A | * | 7/2019 | ........... H04N 19/124 |
| CN | 110475119 A | | 11/2019 | |
| TW | 201706917 A | | 2/2017 | |

OTHER PUBLICATIONS

"International Application Serial No. PCT/CN2019/130472, International Search Report dated Apr. 30, 2020", w/ English Translation, (Apr. 30, 2020), 5 pgs.

"International Application Serial No. PCT/CN2019/130472, Written Opinion dated Apr. 30, 2020", (Apr. 30, 2020), 4 pgs.

\* cited by examiner

SYSTEM AND METHOD FOR COMPRESSING IMAGE BASED ON FLASH IN-MEMORY COMPUTING ARRAY

CROSS-REFERENCE TO RELATED APPLICATION

This application is a Section 371 National Stage Application of International Application No. PCT/CN2019/130472, filed on Dec. 31, 2019, entitled "SYSTEM AND METHOD FOR COMPRESSING IMAGE BASED ON FLASH IN-MEMORY COMPUTING ARRAY," which claims priority to Chinese Application No. 201910738965.3, filed on Aug. 12, 2019, incorporated herein by reference in their entirety.

TECHNICAL FIELD

The present disclosure relates to a field of semiconductor device and integrated circuit technology, and in particular, to a system and a method for compressing an image based on a FLASH in-memory computing array.

BACKGROUND

Image compression aims to reduce time, space, and spectrum redundancy in the image, and use a smaller number of bits to lossy or lossless compress the original image, so as to achieve an image processing technology of efficient storage and image data transmission. The image compression may be divided into three parts: encoding, quantization, and decoding. Encoding and decoding operations account for a large proportion of the image compression.

The development of deep learning and big data technology has led to a sharp increase in unstructured data, such as images and videos. The image compression may reduce an irrelevance and a redundancy of the images, so as to achieve the memory or transmission of images at low bit rates. In traditional image coding standards such as JPEG and JPEG2000, when an image compression ratio is increased, a quantization step size increases correspondingly, which may result in problems such as a decrease in the bit per pixel (BPP), and blocking effects or noises in the decoded images.

SUMMARY

According to an aspect of the present disclosure, a system for compressing an image based on a FLASH in-memory computing array is provided, including: a convolutional neural network for encoding based on the FLASH in-memory computing array, a convolutional neural network for decoding based on the FLASH in-memory computing array, and a quantization module;
wherein the convolutional neural network for encoding based on the FLASH in-memory computing array is configured to encode an original image to obtain a feature image;
wherein the quantization module is configured to quantize the feature image to obtain a quantized image;
wherein the convolutional neural network for decoding based on the FLASH in-memory computing array is configured to decode the quantized image to obtain a compressed image.

According to another aspect of the present disclosure, a method for compressing an image based on a FLASH in-memory computing array, including:
writing a weight matrix of a convolutional neural network for encoding and a weight matrix of a convolutional neural network for decoding into a FLASH in-memory computing array; and inputting an original image;
encoding the original image by using the convolutional neural network for encoding based on the FLASH in-memory computing array, to obtain a feature image;
quantifying the feature image by using a quantization module, to obtain a quantized image;
decoding the quantized image by using the convolutional neural network for decoding based on the FLASH in-memory computing array, to obtain a compressed image.

In order to make the above-mentioned purposes, characteristics and advantages of the present disclosure more apparent and easily understood, the following is a detailed description of preferred embodiments of the present disclosure with reference to the drawings.

BRIEF DESCRIPTION OF THE DRAWINGS

In order to more clearly illustrate technical solutions of the embodiments of the present disclosure, drawings to be used in the embodiments will be briefly introduced below. It should be understood that the following drawings only show certain embodiments of the present disclosure, and therefore should not be regarded as limiting the scope. For those of ordinary skill in the art, other related drawings may be obtained from these drawings without creative work.

DETAILED DESCRIPTION OF EMBODIMENTS

After a plurality of trainings, a convolutional neural network may extract feature images from an image. The extracted feature images are processed by the convolutional neural network, and a compressed image obtained by processing the extracted feature images may reflect original image features to a maximum extent, which effectively solve problems such as blocking effects and noises. The system and method for compressing an image based on a FLASH in-memory computing array of the present disclosure may execute a large number of matrix-vector multiplication operations in the convolutional neural network in the process of image encoding and decoding in parallel, so that the image compression may be accelerated at a hardware level, while greatly reducing energy and hardware resource consumption, which is of great significance to the image compression.

The present disclosure provides a system and a method for compressing an image based on a FLASH in-memory computing array, which mainly implement: (1) in-memory computing architecture and hardware; (2) image compression based on the FLASH in-memory computing array; (3) accelerated image compression based on the FLASH in-memory computing array.

The system and method for compressing the image based on the FLASH in-memory computing array of the present disclosure may construct and train the convolutional neural network for encoding and decoding based on a CPU/GPU, and may obtain a weight distribution of the convolutional neural network. The weights obtained by training are programmed into the FLASH in-memory computing array, and achieve the convolutional neural network for encoding and decoding at the hardware level. An input image is compressed according to a preset compression ratio. The system and method for compressing the image of the present disclosure may greatly reduce data exchange between the processor and the memory cell, significantly improve an energy efficiency ratio of encoding and decoding processes, reduce system hardware overhead and reduce energy consumption.

The technical solutions in the embodiments of the present disclosure will be clearly and completely described below in conjunction with the embodiments and the drawings in the embodiments. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Figure 1:
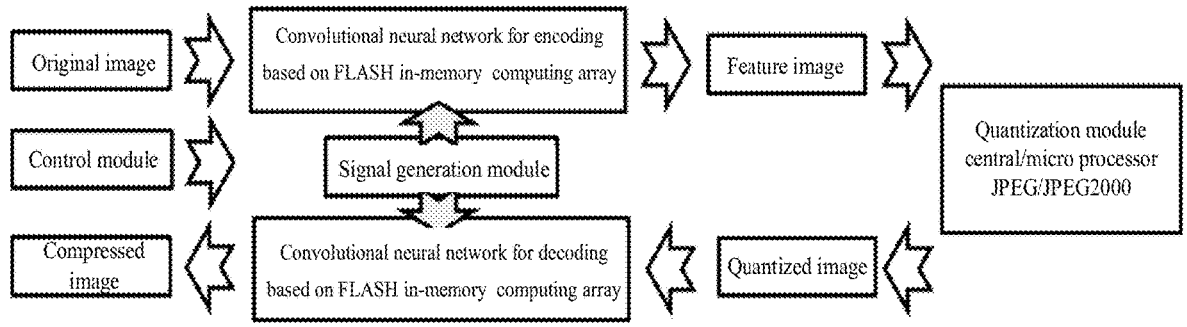
FIG. 1 is a schematic diagram of a system for compressing an image based on a FLASH in-memory computing array according to a first embodiment of the present disclosure.

The first embodiment of the present disclosure provides a system for compressing an image based on a FLASH in-memory computing array. As shown in FIG. 1, the system includes a control module, a signal generation module, a convolutional neural network for encoding based on the FLASH in-memory computing array, a convolutional neural network for decoding based on the FLASH in-memory computing array, and a processor.

The control module is connected to the signal generation module, the convolutional neural network for encoding based on the FLASH in-memory computing array, the convolutional neural network for decoding based on the FLASH in-memory computing array, and the processor. According to control instructions of the processor, the control module outputs control signals to the signal generation module, the convolutional neural network for encoding based on the FLASH in-memory computing array and the convolutional neural network for decoding based on the FLASH in-memory computing array, so as to control an operating sequence of the system for compressing the image.

The convolutional neural network for encoding based on the FLASH in-memory computing array and the convolutional neural network for decoding based on the FLASH in-memory computing array are respectively responsible for encoding and decoding operations in the image compression. The convolutional neural network for encoding based on the FLASH in-memory computing array is a multi-layer neural network, including: an input layer, a plurality of hidden layers and an output layer. An output of the previous layer is used as an input of this layer, and an output of this layer is used as an input of the next layer. Each layer in the convolutional neural network for encoding includes an in-memory computing array based on FLASH.

Figure 2:
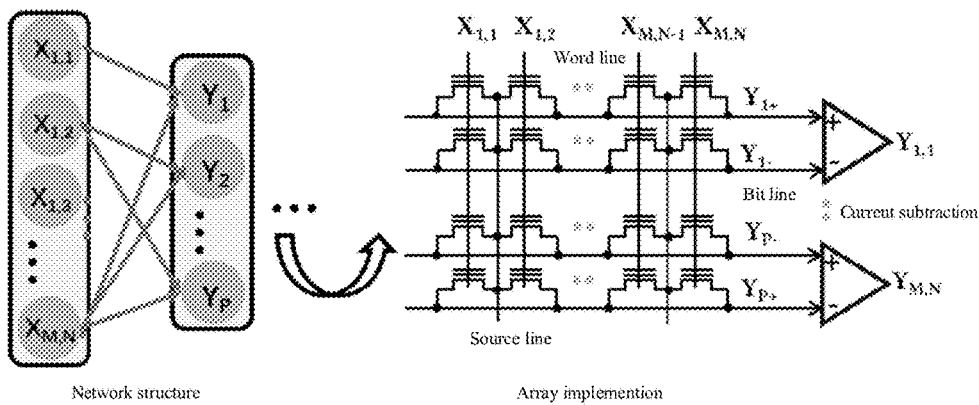
FIG. 2 is a schematic diagram of a FLASH in-memory computing array.

As shown in FIG. 2, the in-memory computing array based on FLASH includes: a plurality of FLASH cells, a plurality of word lines, a plurality of source lines, a plurality of bit lines, and a plurality of subtractors.

In the in-memory computing array composed of the plurality of FLASH cells, gate electrodes of the FLASH cells in each column are connected to the same word line (WL), source electrodes of the FLASH cells in each column are connected to the same source line, and drain electrodes of the FLASH cells in each row are connected to the same bit line (BL).

The number of word lines corresponds to the number of columns in the in-memory computing array, and input data is input to the FLASH cells through the word lines.

The number of source lines corresponds to the number of columns in the in-memory computing array, and each of the source lines is connected to a fixed driving voltage $V_{ds}$, which is applied to the source electrodes of the FLASH cells.

The number of bit lines corresponds to the number of rows in the in-memory computing array, and the bit lines are used to output signals of the drain electrodes of the FLASH cells. Each row of the bit lines is configured to superimpose the drain signal of the FLASH cells in this row and to output the superimposed drain signal as an output signal. That is, the drain electrodes of the FLASH cells in each row are connected to the same bit line, and a total current value on this bit line is the sum of the output values of the FLASH cells in this row.

A threshold voltage of each FLASH cell may be set by programming and erasing. When programming the FLASH cell, hot electrons are injected, the threshold voltage of the FLASH cell increases, and its memory state is regarded as "0", that is, the FLASH cell stores data "0". When erasing the FLASH cell, the electrons are tunneled, the threshold voltage of the FLASH cell decreases, and its memory state is regarded as "1", that is, the FLASH cell stores data "1". It can be seen that by programming and erasing the FLASH cell, the FLASH cell may store two types of data "0" and "1". By converting weight values in a weight matrix of the convolutional neural network into binary numbers, the FLASH cell with the memory state of "0" is used to represent "0" in the binary weight values, and the FLASH cell with the memory state of "1" is used to represent "1" in the binary weight values, so that the in-memory computing array composed of the plurality of FLASH cells may represent the weight matrix.

In the FLASH in-memory computing array of this embodiment, each of the source lines of the FLASH cells is connected to the fixed driving voltage $V_{ds}$. The input data is converted into a binary number and input to the FLASH cells through the word lines. For the "0" in the input data, voltages of 0 are applied to the gate electrodes of the FLASH cells through the word lines, and an output current of the drain electrodes is a product of the input data "0" and the stored data ("0" or "1") of the FLASH cells. For the "1" in the input data, $V_g$, which is a product of the input data "1" and the stored data of the FLASH cells, is applied to the gate electrodes of the FLASH cells through the word lines. The drain electrodes of the plurality of FLASH cells are connected together to output, the "sum current" reflects a result of a product of an input vector and the matrix stored in the FLASH array, which may achieve a matrix-vector multiplication operation.

Each row of bit lines superimpose the drain signals of the FLASH cells in this row, and the superimposed drain signal "sum current" is output as the output signal, that is, the total current value on the bit line is the sum of the output values of the FLASH cells in this row, which may reflect the result of a product of the input vector and the weight matrix stored in the FLASH in-memory computing array.

The number of subtractors corresponds to half of the number of rows in the in-memory computing array, and positive and negative terminals of each subtractor are respectively connected to two adjacent bit lines. Considering that the FLASH cell may not store negative weight values, every two adjacent bit lines are connected to a subtractor. The FLASH cell on the bit line connected to the positive terminal of the subtractor stores a positive weight value, and the FLASH cell on the bit line connected to the negative terminal of the subtractor stores a negative weight value, thereby achieving the matrix-vector multiplication operation.

Each layer in the convolutional neural network for encoding also includes an activation unit. An output terminal of the subtractor is connected to the activation unit. The activation unit activates the output signal, and an activation result is transmitted to the next layer as output data of this layer.

A structure of the convolutional neural network for decoding based on the FLASH in-memory computing array is the same as the structure of the above-mentioned convolutional neural network for encoding, and will not be repeated here.

The signal generation module has two aspects of functions. One is to program the FLASH in-memory computing array according to the output signal of the control module, and the weight values obtained from training are sequentially written into the corresponding FLASH cells; the other is that the input image and the quantized image are respectively converted into voltage signals and applied to the word lines of the FLASH array in the processes of image compression encoding and image compression decoding.

That is, the signal generation module converts the weight values in the weight matrices of each layer in the convolutional neural network into binary numbers, and the corresponding FLASH cells are programmed or erased according to the binary weights to store the weight matrices in the FLASH in-memory computing array. At the same time, the input image and the quantized image are converted into binary signals, and the binary signals are transmitted to the input layers of the convolutional neural network for encoding and the convolutional neural network for decoding.

The processor includes a quantization module. The quantization module adopts standards such as JPEG and JPEG2000, etc. to quantize the output data of the convolutional neural network for encoding.

In the system for compressing the image based on the FLASH in-memory computing array of this embodiment, the original image is encoded by the convolutional neural network for encoding based on the FLASH in-memory computing array, so as to obtain a feature image, and the quantization module quantizes the feature image to obtain a quantized image. The quantized image is decoded by the convolutional neural network for decoding based on the FLASH in-memory computing array, so as to obtain a compressed image. The hardware implementation of this embodiment stores the weight values in the FLASH in-memory computing array, and uses the in-memory computing array for computing, eliminating random access to the weight values in the computing process, thereby achieving computing in memory.

In this embodiment, before the image compression is achieved, a convolutional neural network model for encoding and a convolutional neural network model for decoding need to be built on a software side, and the number of layers, dimensions, the number of channels and the size of the convolution kernel, etc. are determined according to the requirements of image compression for speed, accuracy, and energy consumption, etc. Co-training the constructed convolutional neural network model for encoding, the convolutional neural network model for decoding, and the quantization module to obtain the convolutional neural network for encoding and the convolutional neural network for decoding that meet the requirements of the image compression.

Figure 3:
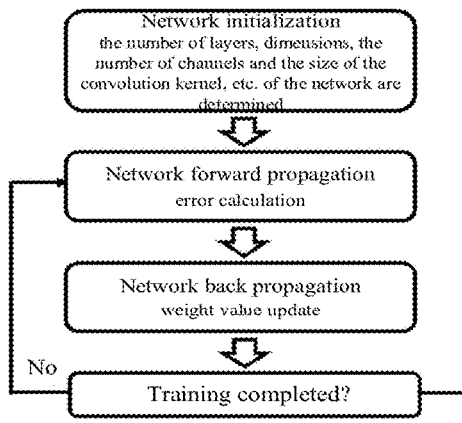
FIG. 3 is a flowchart of a method for compressing an image based on a FLASH in-memory computing array according to a second embodiment of the present disclosure.
Figure 3:
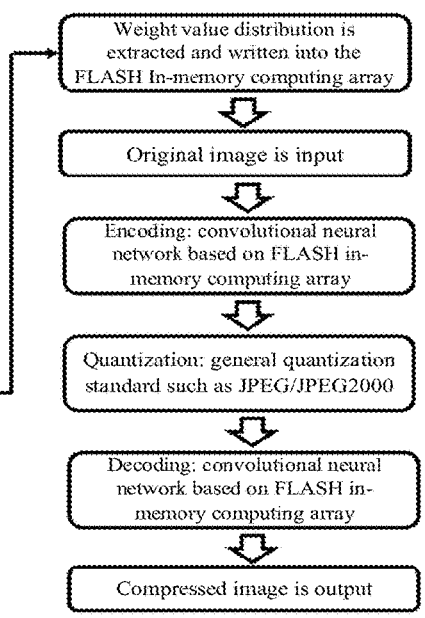

The second embodiment of the present disclosure provides a method for compressing an image based on a FLASH in-memory computing array which, as shown in FIG. 3, includes the following steps:

weight matrices of a convolutional neural network for encoding and a convolutional neural network for decoding are written into the FLASH in-memory computing array; and an original image is input;

the original image is decoded by using the convolutional neural network for encoding of the FLASH in-memory computing array to obtain a feature image;

the feature image is quantized by using a quantization module to obtain a quantized image;

the quantized image is decoded by using the convolutional neural network for decoding based of the FLASH in-memory computing array, to obtain a compressed image.

Before the image compression is executed, the method also includes steps of training the convolutional neural network for encoding and the convolutional neural network for decoding:

the network is initialized first, and a convolutional neural network model for encoding and a convolutional neural network model for decoding are constructed;

the convolutional neural network model for encoding and the convolutional neural network model for decoding are forward propagated by using training data, and an network error is computed;

after that, the convolutional neural network model for encoding and the convolutional neural network model for decoding are back propagated, and weight values of the convolutional neural network model for encoding and the convolutional neural network model for decoding are updated;

whether the training is complete is judged at last, when the trained model meets the image compression requirement, it is considered that the training is completed and the training ends; if the trained model has not yet reached the image compression requirement, then return to the forward propagation step and continue the training.

The above detailed descriptions have explained many embodiments of the above-mentioned system and method by using schematic diagrams, flowcharts and/or examples. In the case where such schematic diagrams, flowcharts, and/or examples include one or more functions and/or operations, those skilled in the art should understand that each function and/or operation in such schematic diagrams, flowcharts, or examples may be implemented individually and/or together through various structures, hardware, software, firmware or substantially any combination thereof.

Unless there are technical obstacles or contradictions, the foregoing various embodiments of the present disclosure may be freely combined to form additional embodiments, and these additional embodiments are all within the protection scope of the present disclosure.

Although the present disclosure has been described with reference to the drawings, the embodiments disclosed in the drawings are intended to exemplify the preferred embodiments of the present disclosure, and should not be understood as a limitation to the present disclosure. Dimensional ratios in the drawings are only schematic, and should not be construed as limiting the present disclosure.

Although some embodiments of the general concept of the present disclosure have been shown and described, those of ordinary skill in the art will understand that changes may be made to these embodiments without departing from the principle and the spirit of the concept of the present disclosure. The scope of the present disclosure is defined by the claims and their equivalents.

What is claimed is:

1. A system for compressing an image based on a FLASH in-memory computing array, comprising: a convolutional neural network for encoding based on the FLASH in-memory computing array, a convolutional neural network for decoding based on the FLASH in-memory computing array, and a quantization module;
   wherein the convolutional neural network for encoding based on the FLASH in-memory computing array is configured to encode an original image to obtain a feature image;
   wherein the quantization module is configured to quantize the feature image to obtain a quantized image;
   wherein the convolutional neural network for decoding based on the FLASH in-memory computing array is configured to decode the quantized image to obtain a compressed image;
   wherein each layer in the convolutional neural network for encoding and each layer in the convolutional neural network for decoding comprises: an in-memory computing array based on FLASH, wherein the in-memory computing array based on FLASH comprises: a plurality of FLASH cells, a plurality of word lines, a plurality of source lines, a plurality of bit lines, and a plurality of subtractors;
   wherein the in-memory computing array is composed of the plurality of FLASH cells, gate electrodes of the FLASH cells in each column are connected to the same word line, source electrodes of the FLASH cells in each column are connected to the same source line, drain electrodes of the FLASH cells in each row are connected to the same bit line, and a positive terminal and a negative terminal of each subtractor are respectively connected to two adjacent bit lines.

2. The system according to claim 1, wherein,
   the number of the word lines corresponds to the number of columns in the in-memory computing array, and input data is input to the FLASH cells through the word lines;
   the number of the source lines corresponds to the number of columns in the in-memory computing array, and each of the source lines is connected to a fixed driving voltage;
   the number of the bit lines corresponds to the number of rows in the in-memory computing array, and each row of the bit lines is configured to superimpose the drain signals of the FLASH cells in this row and to output the superimposed drain signal as an output signal.

3. The system according to claim 1, wherein the FLASH cells are stored with weight values of the convolutional neural network, and the in-memory computing array based on FLASH is stored with a weight matrix of the convolutional neural network.

4. The system according to claim 3, wherein,
   a memory state of each FLASH cell is regarded as "0" in response to the FLASH cell being programmed;
   a memory state of each FLASH cell is regarded as "1" in response to the FLASH cell being erased.

5. The system according to claim 1, wherein,
   the FLASH cell on the bit line connected to the positive terminal of the subtractor is stored with a positive weight value, and the FLASH cell on the bit line connected to the negative terminal of the subtractor is stored with a negative weight value.

6. The system according to claim 1, wherein each layer in the convolutional neural network for encoding and each layer in the convolutional neural network for decoding further comprises an activation unit, an output terminal of the subtractor is connected to the activation unit, the activation unit activates an output signal, and an activation result is transmitted to the next layer as output data.

7. The system according to claim 1, wherein the quantization module is a central process or a microprocessor, and the quantization module adopts JPEG standard or JPEG2000 standard to quantize the feature image.

8. A method for compressing an image based on a FLASH in-memory computing array, comprising:
   writing a weight matrix of a convolutional neural network for encoding and a weight matrix of a convolutional neural network for decoding into a FLASH in-memory computing array; and inputting an original image;
   encoding the original image by using the convolutional neural network for encoding based on the FLASH in-memory computing array, to obtain a feature image;
   quantifying the feature image by using a quantization module, to obtain a quantized image;
   decoding the quantized image by using the convolutional neural network for decoding based on the FLASH in-memory computing array, to obtain a compressed image;
   wherein the method further comprises:
      initializing the network, and constructing a convolutional neural network model for encoding and a convolutional neural network model for decoding;
      forward propagating the convolutional neural network model for encoding and the convolutional neural network model for decoding by using training data, and computing an network error;
      back propagating the convolutional neural network model for encoding and the convolutional neural network model for decoding, and updating weight values of the convolutional neural network model for encoding and the convolutional neural network model for decoding;
      completing the training and ending the training steps in response to the trained model meets an image compression requirement; returning to the forward propagation step and continuing the training in response to the trained model not meeting the image compression requirement.

* * * * *